United States Patent
Hershenson (10) Patent No.: US 9,319,854 B2
(45) Date of Patent: Apr. 19, 2016

(54) HIGH FIDELITY VOICEMAIL SYSTEM (71) Applicant: Google Inc., Mountain View, CA (US)

(72) Inventor: Matthew J. Hershenson, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/972,121

(22) Filed: Aug. 21, 2013

(65) Prior Publication Data
US 2014/0227998 A1    Aug. 14, 2014

Related U.S. Application Data (60) Provisional application No. 61/764,051, filed on Feb. 13, 2013.

(51) Int. Cl.
*H04W 4/12* (2009.01)
*H04W 4/16* (2009.01)
*H04M 3/533* (2006.01)

(52) U.S. Cl.
CPC ........... *H04W 4/12* (2013.01); *H04W 4/16* (2013.01); *H04M 3/533* (2013.01)

(58) Field of Classification Search
CPC .. H04M 1/65; H04M 3/53333; H04M 1/6505; H04M 3/533
See application file for complete search history.

(56) References Cited

U.S. PATENT DOCUMENTS

| | | | |
|---|---|---|---|
| 6,031,896 A | 2/2000 | Gardell et al. | |
| 6,405,030 B1 | 6/2002 | Suprunov | |
| 7,676,221 B2 | 3/2010 | Roundtree et al. | |
| 7,873,371 B2* | 1/2011 | Oberg et al. | 455/456.3 |
| 8,417,223 B1 | 4/2013 | Trivi | |
| 8,472,589 B1* | 6/2013 | Green et al. | 379/88.17 |
| 2004/0096043 A1* | 5/2004 | Timmins | H04M 3/53366 379/88.22 |
| 2008/0260114 A1* | 10/2008 | Siminoff | 379/88.14 |
| 2009/0274279 A1* | 11/2009 | Reynolds | 379/88.16 |
| 2010/0159893 A1 | 6/2010 | Baldwin et al. | |
| 2013/0072165 A1* | 3/2013 | Rondeau et al. | 455/413 |

\* cited by examiner

*Primary Examiner* — Mazda Sabouri
*Assistant Examiner* — Edward Zhang
(74) *Attorney, Agent, or Firm* — Fish & Richardson P.C.

(57) ABSTRACT

Methods, systems, and apparatus, including computer programs encoded on a computer storage medium, for a high fidelity voicemail system. In one aspect, a method includes detecting, by a caller device, a prompt to leave a voicemail message. The method further includes generating, by the caller device, a recording of the voicemail message based on detecting the prompt. The method further includes storing, by the caller device, the recording of the voicemail message. The method further includes transmitting, by the caller device, the stored recording of the voicemail message.

21 Claims, 3 Drawing Sheets

HIGH FIDELITY VOICEMAIL SYSTEM

CROSS-REFERENCES TO RELATED APPLICATION

This application claims the benefit of U.S. Provisional Application Ser. No. 61/764,051, filed on Feb. 13, 2013, which is incorporated by reference.

TECHNICAL FIELD

This specification generally relates to voicemail systems, and one particular implementation relates to recording voicemail messages.

BACKGROUND

A voicemail system allows a caller to leave a voicemail message when a callee does not answer a call. The callee can call the voicemail system at a later time and hear a recording of the voicemail message left by the caller.

SUMMARY

According to an innovative aspect of the subject matter described in this specification, a caller's phone can record and store a voicemail message left by a caller. For instance, if the callee does not answer a telephone call, then a telephone network can direct the call to the voicemail system. The voicemail system can prompt the caller to leave a voicemail message, where the prompt triggers the caller's phone to locally record and store the voicemail message. As the voicemail message is being locally recorded on the caller's phone, the phone also plays the sound of the caller's voice over the outgoing audio stream of the caller's phone, to be recorded by the voicemail system from over a voice connection.

After the caller disconnects the call, the caller's phone transmits the locally recorded copy of the voicemail message over a data connection to the voicemail system. The voicemail system matches the copy of the voicemail message recorded by the caller's phone with the copy of the voicemail message recorded over the voice connection, and replaces the copy of the voicemail message recorded over the voice connection with the copy of the voicemail message recorded by the caller's phone.

The copy of the voicemail message recorded by the caller's phone may be a higher fidelity recording of the voicemail message than the copy of the voicemail message recorded over the voice connection, because the sound of the caller's voice may not have been processed using lossy compression prior to recording the voicemail message on the caller's phone or poor reception may have degraded the sound of the caller's voice. The caller's phone uses lossy compression to process the sound of the caller's voice to reduce the amount of data transmitted over the voice connection during the telephone call.

In general, another innovative aspect of the subject matter described in this specification may be embodied in methods that include the actions of detecting, by a caller device, a prompt to leave a voicemail message; generating, by the caller device, a recording of the voicemail message based on detecting the prompt; storing, by the caller device, the recording of the voicemail message; and transmitting, by the caller device, the stored recording of the voicemail message.

These and other embodiments can each optionally include one or more of the following features. The prompt to leave the voicemail message is detected over a telephone connection between the caller device and a telephone network. The action of detecting a prompt to leave a voicemail message includes detecting an audio tone associated with leaving voicemail messages. The action of detecting a prompt to leave a voicemail message includes obtaining a transcription of a recording of a telephone call; and determining that the transcription includes text associated with leaving voicemail messages. The action of detecting a prompt to leave a voicemail message includes receiving, over a voice connection or a data connection, indicia associated with leaving voicemail messages from a voicemail system.

The actions further include generating metadata associated with the recording of the voicemail message. The generated metadata includes a time and date stamp; data associated with a callee device; data associated with the caller device; and an authentication code. The actions further include, before transmitting the stored recording of the voicemail message, receiving an authenticable request from a voicemail system to transmit the stored recording of the voicemail message; and authenticating the received request. The actions further include, before transmitting, by the caller device, the stored recording of the voicemail message, determining when to transmit the stored recording of the voicemail message.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. For example, the caller's phone records the voicemail message in higher fidelity than the voicemail system recording the voicemail message over the voice connection because, as noted above, the caller's phone records the voicemail message prior to the caller's phone using lossy compression on the sound of the caller's voice. Furthermore, a higher fidelity recording allows the voicemail system to more accurately transcribe the voicemail message.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
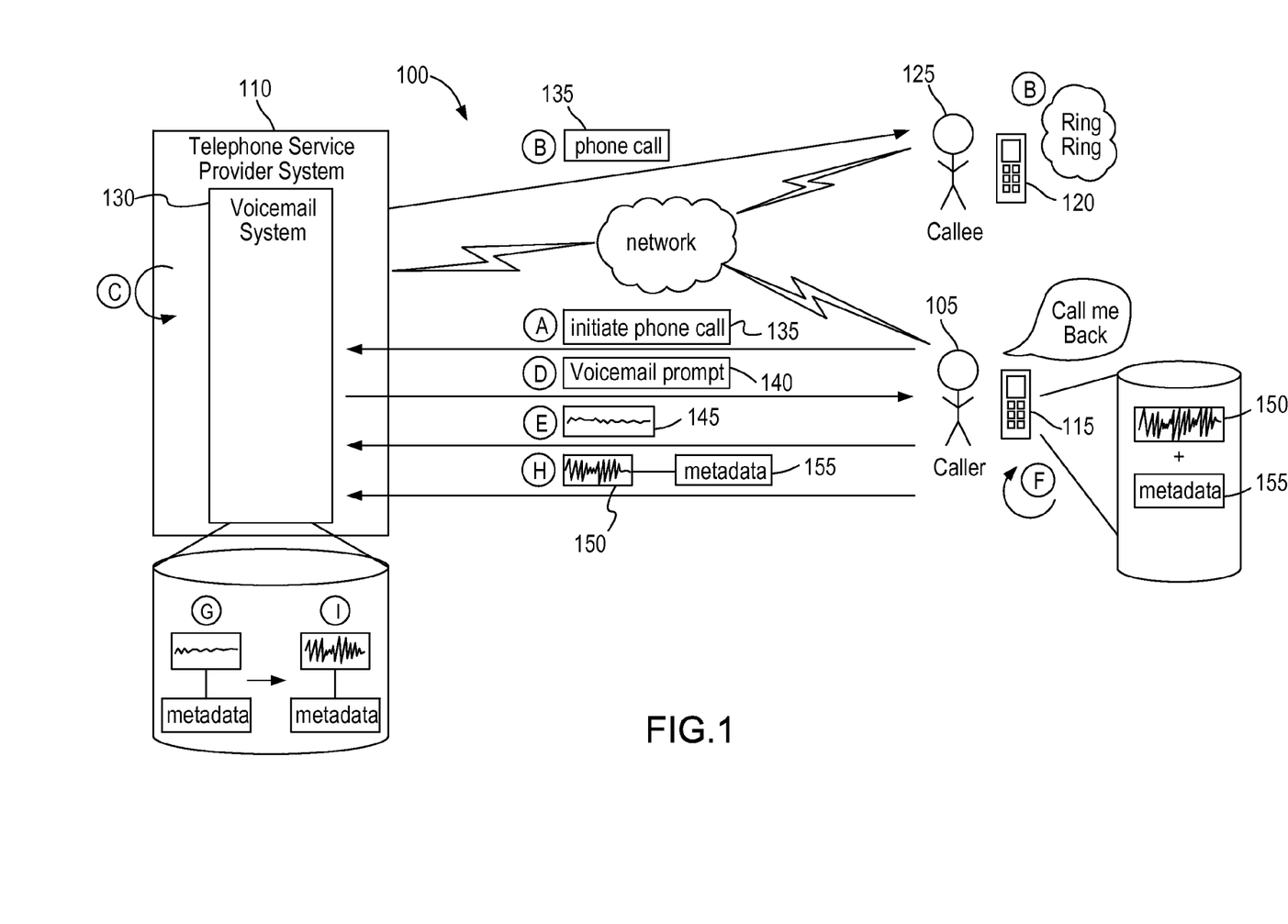
FIG. 1 is an example telephone network illustrating a caller leaving a voicemail message.

FIG. 1 is an example telephone network 100 illustrating a caller 105 leaving a voicemail message. The telephone network 100 includes a telephone service provider system 110 that manages and directs telephone calls and data over the telephone network 100. In particular, the telephone service provider system 110 directs a telephone call and a voicemail message between a caller's phone 115 and a callee's device 120. FIG. 1 illustrates the flow of the telephone call and the voicemail message using stages "A" to "J."

During stage "A," the caller 105, using the caller's phone 115, initiates a phone call 135 to the callee's device 120. The telephone service provider 110 receives the phone call 135 and directs the phone call 135 to the callee's device 120 in stage "B." The callee's device 120 rings or otherwise indicates that the callee's device 120 is receiving an incoming phone call. The callee 125 does not answer the phone call 135. The telephone service provider system 110 redirects the phone call 135 to the voicemail system 130 during stage "C."

During stage "D," the voicemail system 130 prompts the caller 105 to leave a voicemail message. In some implementations, the voicemail prompt 140 is a default greeting set up by the voicemail system 130. For example, the voicemail prompt 140 may be, "The person at 555-123-4567 is not available. Please leave a message after the tone . . . BEEP." In some implementations, the voicemail prompt 140 is a custom greeting set up by the callee. For example, in the callee's voice, the voicemail prompt 140 may be, "Hello, you have reached Bob, please leave a message . . . BEEP."

In some implementations, the voicemail prompt 140 includes an additional signal that is transmitted over a data connection and that is not audible to the caller 105. For example, the voicemail prompt 140 may play the custom greeting or the default greeting, and additionally send a signal to the caller's phone over a data connection indicating that the caller's phone reached the voicemail system 130. This signal may be referred to as an "out of band" signal because this signal is outside of the voice connection used to transmit voice signals. In contrast, an "in band" signal includes the "BEEP" at the end of the voicemail prompt 140. The "BEEP" is an "in band" signal because the "BEEP" is audible to the caller and is transmitted over the voice connection. Furthermore, the in band signal or the out of band signal may indicate, either explicitly when the caller's phone The caller's phone 115 may detect the in or out of band signal received from the voicemail system 130 and determine that the telephone service provider system 110 has directed the phone call 135 to the voicemail system 130. For example, the caller's phone 115 may determine that the voicemail system 130 has directed the phone call 135 to the voicemail system 130 by determining that the sound of the telephone number 555-123-4567 was received by the caller's phone 115 within the first five seconds of the phone call. The caller's phone 115 may determine that the voicemail system 130 has directed the phone call 135 to the voicemail system 130 by determining that the sound corresponding to, "Please leave a message," was received by the caller's phone 115. In some implementations, the caller's phone 115 may transcribe the sounds received by the caller's phone 115 and determine that a phone number or some particular text such as "please leave a message" is included in an early portion of the transcript. The caller's phone 115 may determine that the voicemail system 130 has directed the phone call 135 to the voicemail system 130 upon hearing the "BEEP" sound over the voice connection. In some implementations, the caller's phone 115, may determine that the voicemail system 130 has directed the phone call 135 to the voicemail system 130 by detecting an "out of band" signal over the data connection. In some implementations, an in band signal or the out of band signal may indicate, either explicitly or inferentially, when the caller's phone 115 should start or stop recording. For example, an in or out of band signal may indicate that the caller's phone 115 should start recording immediately, or in three seconds. An in or out of band signal may signal may signal that the caller's phone should stop recording immediately or in a particular period of time.

During stage "E," the caller 105 records a voicemail message on both the voicemail system 130 and the caller's phone 115. The caller's phone 115 processes and transmits the sound of the caller's voice over the voice connection to the voicemail system 130. In processing the sound of the caller's voice, the caller's phone 115 may compress the sound of the caller's voice before transmission over the voice connection. Additionally, the voice connection may be degraded because of reception issues. The voicemail system 130 records the sound of the caller's voice transmitted over the voice connection and stores the sound as a voicemail message recorded over the voice connection 147. Additionally, during stage "E," the caller's phone 115 records the sound of the caller's voice before transmission over the voice connection. Recording the caller's voice before transmission over the voice connection results in the phone locally storing a higher fidelity voicemail message. The voicemail message recorded by the caller's phone 150 is not degraded by a poor voice connection between the voicemail system 130 and the caller's phone 115. Furthermore, the sound of the voicemail message recorded by the caller's phone 150 is not processed as the sound of the caller's voice would be before transmitting the sound of the caller's voice over the voice connection.

During stage "F," the caller's phone 115, processes the voicemail message recorded by the caller's phone 150 and optionally adds metadata 155. The metadata 155 further identifies the voicemail message recorded by the caller's phone 150. The metadata 155 may include a time stamp, data identifying the caller, data identifying the callee, length of the voicemail message, size of the voicemail message, or an authentication code. In some implementations, the caller's phone 115 encrypts the voicemail message recorded by the caller's phone 150. For example, the caller's phone 115 may include an encryption key that the caller's phone 115 uses to encrypt the voicemail message recorded by the caller's phone 150, where the encrypted voicemail message recorded by the caller's phone 150 may be decrypted by the voicemail system 130 or by the callee's device 120. In some implementations, the caller's phone 115 transcribes the voicemail message recorded by the caller's phone 150. For example, if the voicemail message recorded by the caller's phone 150 was "Call me back," then the caller's phone 112 would add the text "Call me back" to the metadata 155.

During stage "G" and similar to stage "F," the voicemail system 130 processes the voicemail message recorded over the voice connection 147 and optionally adds metadata 160. The metadata 160 further identifies the voicemail message recorded over the voice connection 147. The metadata 160 may include a time stamp, data identifying the caller, data identifying the callee, length of the voicemail message, or size of the voicemail message. In some implementations, the voicemail system 130 transcribes the voicemail message recorded over the voice connection 147. For example, if the voicemail message recorded over the voice connection 147, as transcribed by the voicemail system 130, was "Fall me snack," then the voicemail system 130 would include among the text of the metadata 160 "Fall me snack".

During stage "H," the caller's phone 115 sends the voicemail message recorded by the caller's phone 150 and metadata 155 to the voicemail system 130 over the data connection. In some implementations, the caller's phone 115 sends the voicemail message recorded by the caller's phone 150 and metadata 155 to the voicemail system automatically upon completion of processing the voicemail message recorded by the caller's phone 150 during stage "F." In some implementations, the caller's phone 115 may wait until the caller's phone 115 receives a request from the voicemail system 130 for the voicemail message recorded by the caller's phone 150 and metadata 155. For example, the voicemail system 130 may process the voicemail message recorded over the voice connection 147, as during stage "G," and query the caller's phone 115 to determine if the caller's phone 115 recorded a high fidelity copy of the voicemail message. Upon receiving the query, the caller's phone 115 can send the voicemail message recorded by the caller's phone 150 and metadata 155.

The caller's phone 115 sends the voicemail message recorded by the caller's phone 150 and metadata 155 to the voicemail system using the data connection. In some implementations, the caller's phone 115 waits until the phone is connected to a Wi-Fi signal before the caller's phone 115 sends the voicemail message recorded by the caller's phone 150 and metadata 155. In some implementations, the caller's phone 115 determines if there is sufficient data remaining on the caller's data plan before sending the voicemail message recorded by the caller's phone 150 and metadata 155 over the data connection on the telephone network 100. For example, if caller's phone 115 determines that a caller 105 has 50 megabytes of data remaining in the caller's billing cycle and sending the voicemail message recorded by the caller's phone 150 and metadata 155 consumes 1 megabyte of data, then the caller's phone may determine to send the voicemail message recorded by the caller's phone 150 and metadata 155 using the data connection on the telephone network 100.

In some implementations, the caller's phone 115 or the voicemail system 130 may implement a security mechanism. For example, the caller's phone may require that prior to sending the voicemail message recorded by the caller's phone 150 and metadata 155 to the voicemail system 130, the caller's phone 130 must authenticate the voicemail system 130. Alternatively, the voicemail system 130 may require authentication from the caller's phone 130 before receiving the voicemail message recorded by the caller's phone 150 and metadata 155. In some implementations, the caller's phone 115 may delete the local copy of the voicemail message recorded by the caller's phone 150 and metadata 155 stored on the caller's phone 115 once the caller's phone 115 has sent the voicemail message recorded by the caller's phone 150 and metadata 155 to the voicemail system. Before deleting the voicemail message recorded by the caller's phone 150 and metadata 155, the caller's phone may require confirmation that the voicemail system 130 received the voicemail message recorded by the caller's phone 150 and metadata 155.

During stage "I," the voicemail system 130 replaces the voicemail message recorded over the voice connection 147 with the voicemail message recorded by the caller's phone 150. The voicemail system 130 matches the metadata 155 received from the caller's phone and the metadata 160 generated from processing the voicemail message recorded over the voice connection 147. If the metadata sufficiently correlate, then the voicemail system 130 replaces the voicemail message recorded over the voice connection 147 with the voicemail message recorded by the caller's phone 150. Furthermore, the voicemail system 130 may transcribe the voicemail message recorded by the caller's phone 150. The voicemail system 130 may generate a confidence score associated with transcribing of the voicemail message recorded by the caller's phone 150. If the confidence score is greater than a confidence score determined by the caller's phone 115 when the caller's phone 115 transcribed the voicemail message recorded by the caller's phone 150, then the voicemail system 130 can replace the caller's phone transcription with the voicemail system transcription.

The voicemail system 130 sends data indicating that the callee 125 has a voicemail message on the voicemail system 130. The voicemail system may send the metadata 160 and the transcription of the voicemail message recorded by the caller's phone 150 along with the data indicating that the callee 125 has a voicemail message. The callee's phone 120 may display the metadata 160 to assist the callee 125 in determining if the callee 125 should listen to the voicemail message. If the callee 125 requests to hear the voicemail message, then the voicemail system 130 sends the sound of the voicemail message recorded by the caller's phone 150 over the voice connection to the callee's device 120.

Figure 2:
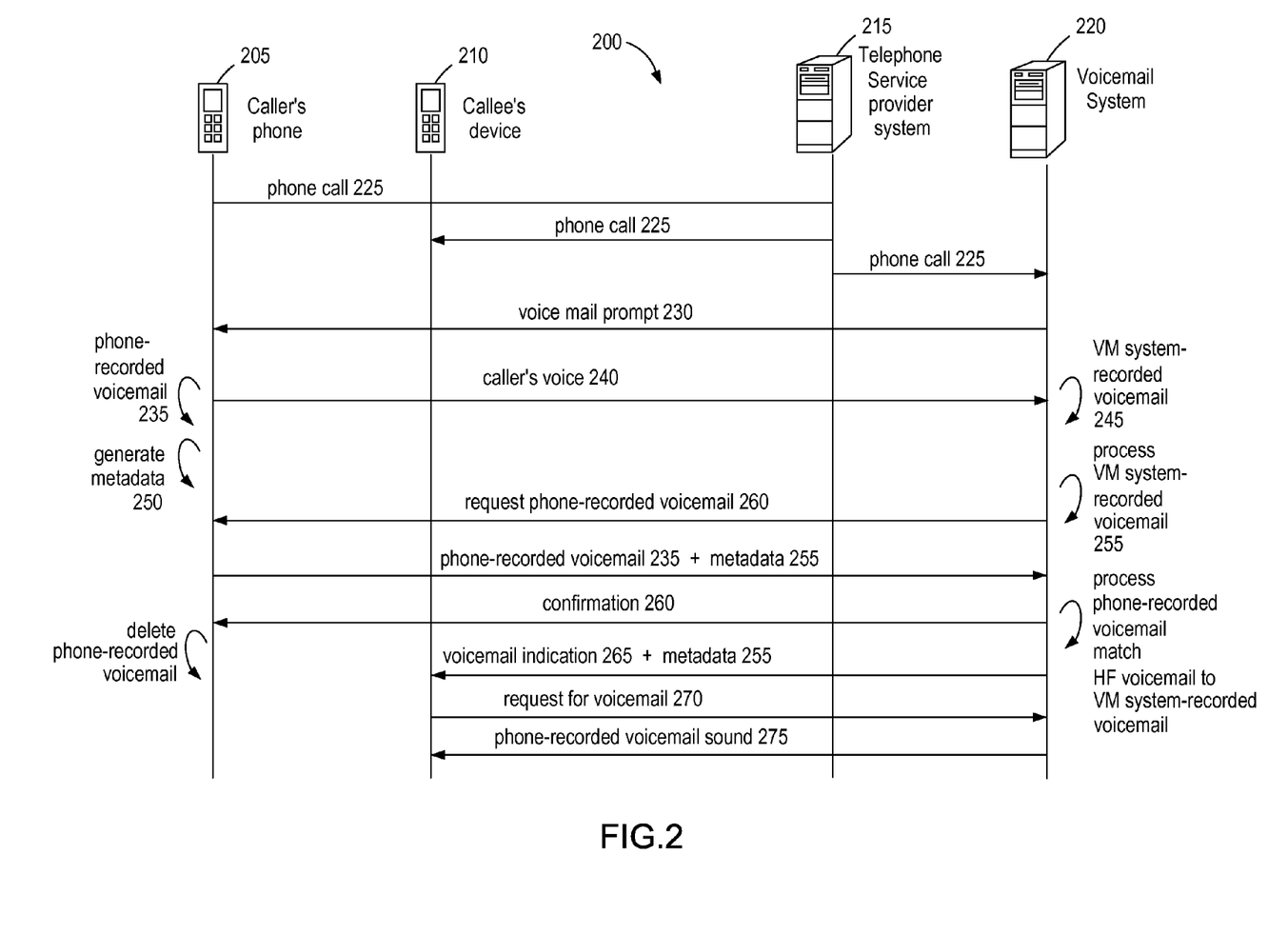
FIG. 2 is a swim lane diagram illustrating a caller leaving a voicemail message.

FIG. 2 is a swim lane diagram illustrating a process 200 of a caller leaving a voicemail message. In general, the process 200 involves a caller using a caller's phone 205 to place a phone call to the callee on a callee's device 210. A telephone service provider system 215 directs the phone call from the caller's phone 205 to the callee's device 210. The callee does not answer the phone call from the caller and the telephone service provider system 215 directs the phone call to the voicemail system 220.

The process 200 begins with the caller initiating a telephone call 225 from the caller's phone 205 to the callee's device 210. The telephone service provider system 215 receives the telephone call 225 and directs the telephone call 225 to the callee's device 210. The callee does not answer the telephone call 225 and the telephone service provider system 215 directs the telephone call 225 to the voicemail system 220.

The voicemail system 220 sends a voicemail prompt 230 to the caller's phone. The voicemail prompt 230 may either be a prompt customized by the callee or a default prompt determined by the voicemail system 220. The voicemail prompt 230 may include an "out of band" signal that the voicemail system 230 transmits over a data connection and that is not played over the incoming audio stream to the caller.

The caller's phone 205 detects the voicemail prompt 230. Where the voicemail prompt 230 includes an "out of band" signal, the caller's phone may detect the "out of band" signal and determine that the caller's phone has encountered a voicemail system. If the voicemail prompt 230 does not include an "out of band" signal or the caller's phone 205 is unable to detect the "out of band" signal, then the caller's phone 230 may automatically begin to transcribe the sound of the caller's voice and the sound of incoming audio stream. If by transcribing the sounds of the caller's voice and the incoming audio stream, the caller's phone 205 determines that the caller's phone 205 has encountered a voicemail system, then the caller's phone 205 can continue to record the sound of the caller's voice. If by transcribing the sounds of the caller's voice and the incoming audio stream, the caller's phone 205 determines that the caller's phone 205 has not encountered a voicemail system, then the caller's phone can stop recording the sounds of the caller's voice and the incoming audio stream and delete the portion already recorded.

The caller's phone 205 records and stores the sound of the caller's voice before the sound of the caller's voice is processed for transmitting over a voice connection. At approximately the same time as the caller's phone 205 records the voicemail message recorded by the caller's phone 235, the caller's phone 205 processes the sound of the caller's voice and sends the sound of the caller's voice 240 to the voicemail system 220 over the voice connection. The voicemail system 220 records the voicemail message received over the voice connection 245.

The caller's phone 205 processes the voicemail message recorded by the caller's phone 235. The caller's phone 205 may optionally add metadata 250 to the voicemail message recorded by the caller's phone 235. The metadata 250 may include data identifying the caller, data identifying the callee, a time stamp, a length of the voicemail, a size of the voicemail, and an authentication code. The authentication code may be used by the caller's phone 205 to verify a request by the voicemail system 205 for a copy of the voicemail message recorded by the caller's phone 235. The metadata 250 may further include a transcription of the voicemail message recorded by the caller's phone 235.

The voicemail system 220 processes the voicemail message recorded over the voice connection 245 and optionally adds metadata 255 to the voicemail message recorded over the voice connection 245. Similar to the processing by the caller's phone 205, the voicemail system 220 may include data identifying the caller, data identifying the callee, a time stamp, a length of the voicemail, a size of the voicemail, and a transcription.

In some implementations, the voicemail system 220 sends a request 260 to the caller's phone 205 for the voicemail message recorded by the caller's phone 235 over the data connection. This request 260 may be an inquiry to determine if the caller's phone 205 stored a recording of the voicemail message recorded by the caller's phone 235. For example, the voicemail system 220 may automatically query the caller's phone 205 to determine if a recording of the voicemail message recorded by the caller's phone 235 exists. In another example, the voicemail system 220 may query the caller's phone 205 to determine if a recording of the voicemail message recorded by the caller's phone 235 exists, but only if the voicemail system 220 determines that the voicemail message recorded over the voice connection 245 is not of satisfactory quality. The voicemail system 220 may determine that the voicemail message recorded over the voice connection 245 is not of satisfactory quality if a confidence score associated with the transcription of the voicemail message recorded over the voice connection 245 does not satisfy a threshold.

The caller's phone 205 sends the voicemail message recorded by the caller's phone 235 and accompanying metadata 250 to the voicemail system 220 over the data connection. The time when a caller's phone sends the voicemail message recorded by the caller's phone 235 and accompanying metadata 250 to the voicemail system 220 may be determined by a number of factors. The factors may include whether the caller's phone 205 is connected to a Wi-Fi signal, the data plan associated with the caller's phone 205, the amount of data left in the billing cycle associated with the caller's phone 205, caller preferences, voicemail system 220 rules, the size of the voicemail message recorded by the caller's phone 235, or the current time of day.

For example, the caller may set the caller's phone 205 to send voicemail message recorded by the caller's phones once per day at 2:00 AM. Additionally, the voicemail system 220 may have a rule that if the caller's phone 205 is connected to the telephone network through the data connection, then the voicemail system 220 may request that the caller's phone 205 send the voicemail message recorded by the caller's phone 235 and accompanying metadata 250 to the voicemail system 220 and override the user preferences. A voicemail system 220 may require the voicemail message recorded by the caller's phone 235 because the voicemail system 220 is unable to process the voicemail message recorded over the voice connection 245 due to the quality of the voicemail message recorded over the voice connection 245 being too low.

The voicemail system 220 receives the voicemail message recorded by the caller's phone 235 and sends back a confirmation 260 to the caller's phone 205. The caller's phone deletes the voicemail message recorded by the caller's phone 235 upon receiving the confirmation 260.

The voicemail system 220 matches the voicemail message recorded by the caller's phone 235 with the voicemail message recorded over the voice connection 245 and replaces the voicemail message recorded over the voice connection 245 with the voicemail message recorded by the caller's phone 235. The voicemail system 220 matches the voicemail message recorded by the caller's phone 235 with the voicemail message recorded over the voice connection 245 by examining the metadata of each voicemail message. For example, the voicemail system 220 may examine the data identifying the caller, the data identifying the callee, the time stamp, the length of the voicemail message, or the transcriptions.

The voicemail system 220 may perform an additional transcription of the voicemail message recorded by the caller's phone 235. The voicemail system 220 may replace the transcription determined by the caller's phone 205 or the transcription of the voicemail message recorded over the voice connection 245 with the transcription of the voicemail message recorded by the caller's phone 235 determined by the voicemail system 220. The replacement may occur if a confidence score associated with the transcription of the voicemail message recorded by the caller's phone 235 determined by the voicemail system 220 is greater than a confidence score associated with the other transcriptions. The voicemail system 220 may replace the transcriptions because, in some instances, the voice recognition system associated with the voicemail system 220 may be more robust than the voice recognition system associated with the caller's phone 205, and the voicemail system 220 would be preforming voice recognition on the voicemail message recorded by the caller's phone 235.

The voicemail system 220 sends an indication 260 to the callee's device 210 to notify the callee that the callee has a voicemail message on the voicemail system 220. The indication 265 can include the metadata associated with the voicemail message recorded by the caller's phone 235. For example, the indication 265 may include data identifying the caller, the time the caller left the voicemail message, a length of the voicemail message, or a transcription of the voicemail message. In some implementations, the voicemail system 220 sends the indication 260 to an account associated with the callee. For example, if the callee has an account that receives voicemail messages or transcriptions of voicemail messages or both, then the voicemail system 220 may send the indication 260 to the callee's account.

The callee uses the callee's device 210 to send a request 270 to hear the voicemail message. In some implementations, the request 270 may originate from another device besides the callee's device 210. For example, the callee may send the request 270 from a computer or from another mobile device or from anywhere the callee is able to log into the callee's account mentioned above.

The voicemail system 220 sends the sound of the voicemail message recorded by the caller's phone 275 to the callee's device 210. The sound of the voicemail message recorded by the caller's phone 275 may be delivered using a voice connection or a data connection. If the callee's device 210 is a telephone then the sound of the voicemail message recorded by the caller's phone 275 may be delivered over the voice connection. If the callee requested the sound of the voicemail message recorded by the caller's phone 275 from a device other than the callee's device 210 then the sound of the voicemail message recorded by the caller's phone 275 would likely be delivered over a data connection.

Figure 3:
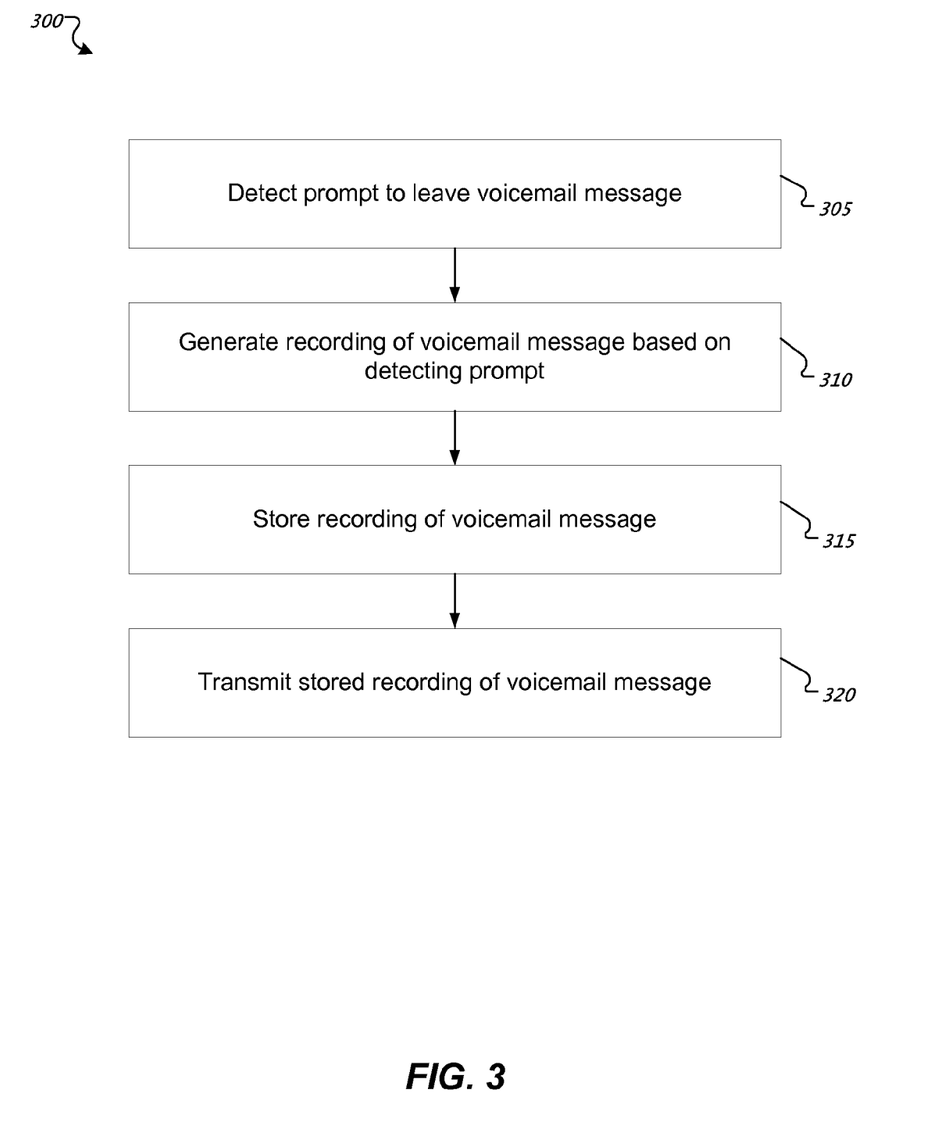
FIG. 3 is a flowchart illustrating the process of a caller leaving a voicemail message.

FIG. 3 is a flowchart illustrating the process 300 of a caller leaving a voicemail message. In general, the process 300 records a caller's voicemail message and sends the voicemail message to a voicemail system. The process 300 will be described as being performed by a caller's phone, for example, the caller's phone 115 as shown in FIG. 1.

The caller's phone detects a prompt to leave a voicemail message (305). A voicemail prompt is sent to the caller's phone by a voicemail system when the callee does not answer a phone call from the caller on the callee's device. The voicemail prompt indicates to the caller that the caller should leave a voicemail message that will be delivered to the callee. The voicemail prompt also signals to the caller's phone that the callee did not answer the callee's device.

In some implementations, the caller's phone may detect the voicemail prompt by transcribing the received voice signal. For example, the caller's phone may determine that the received voice signal said "Hello, you have reached Bob." In this case, the caller's phone may determine that the phrase "you have reached" signals that the caller's phone has reached a voicemail system. As another example, the caller's phone may determine that the received voice signal said "Hello," and then the caller began speaking. The caller's phone may determine that "hello" from the callee's device followed by the caller's voice signals that the caller's phone did not reach a voicemail system. If the caller's phone determines that the caller's phone did not reach a voicemail system, then the caller's phone stops transcribing the call and deletes any transcription of the beginning of the telephone call.

In some implementations, the caller's phone may detect the voicemail prompt by detecting an audible tone that typically follows voicemail prompts and that is received over a voice connection. For example, if the caller's phone determines that it received an audible "BEEP" signal over a voice connection, then the caller's phone can determine that the caller's phone reached a voicemail system.

Alternatively, a voicemail system may use "out of band" signaling to signal to a calling phone that the calling phone has encountered a voicemail system. An "out of band" signal is a signal that is outside of the voice connection used to transmit speech over a telephone network and instead is transmitted over the data connection. An "in band" signal is a signal that is transmitted through the voice connection. A voicemail system may send an "out of band" signal to the caller's phone when the voicemail system prompts the caller to leave a message. Upon detecting the "out of band" signal, the caller's phone can determine that the caller's phone encountered a voicemail system. "Out of band" signaling may also be used to signal that a callee has answered a telephone call. For example, a telephone service provider system may send a different "out of band" signal to a caller's phone when a callee answers a caller's telephone call. The caller's phone can detect the different "out of band" signal and determine that the callee answered the telephone call.

The caller's phone generates a recording of the voicemail message based on detecting the prompt (310). Once the caller's phone determines that the caller's phone has encountered a voicemail system, the caller's phone can record or continue recording the sound of the caller's voice. The caller's phone records the sound of the caller's voice before the sound is processed in preparation for sending the sound of the caller's voice over the voice connection. In some implementations, the sound of the caller's voice may be sampled at a particular sampling rate during recording by the caller's phone. For example, the caller's phone may sample the caller's voice at 22,050 Hz or 44,100 Hz. In some implementations, the caller's phone may use a particular number of bits to represent each sample. For example, the caller's phone may use sixteen or thirty-two bits to represent each sample.

When the caller stops leaving a voicemail message, the caller's phone stops recording the sound of the caller's voice. The caller's phone may determine that the caller has stopped leaving a voicemail message when the caller hangs up the phone or when the caller has stopped talking for a particular amount of time. For example, the caller's phone may stop recording once the caller has stopped talking for twenty seconds. Alternatively, the caller's phone may stop recording once the length of the voicemail message has reached a particular length. For example, the caller's phone may stop recording once the length of the voicemail message reaches two minutes. Once the caller's phone stops recording the voicemail message, the caller's phone stores the voicemail message locally on the caller's phone (315).

The caller's phone processes the voicemail message recorded by the caller's phone and optionally adds metadata to the voicemail message recorded by the caller's phone. The metadata may include data identifying the caller and the callee such as phone numbers, names stored in an address book that is accessible by the caller's phone, or other data that is received from the telephone service provider system. The metadata may also include a time stamp indicating when the caller left the voicemail message and an authentication code that the caller's phone can use to verify a request for the voicemail message. Furthermore, the caller's phone can also transcribe the voicemail message and include the transcription in the metadata. The caller's phone may also encrypt the voicemail message for added security.

The caller's phone transmits the voicemail message recorded by the caller's phone (320). The caller's phone determines an appropriate time to transmit the voicemail message recorded by the caller's phone. Because sending the voicemail message recorded by the caller's phone occurs over a data connection, the caller's phone may use several different signals to determine when to send the voicemail message recorded by the caller's phone. For example, the caller's phone may determine whether the caller's phone is connected to a Wi-Fi signal, the type of data plan associated with the caller's phone, the amount of data left on the caller's data plan for the current billing cycle, or the typical data usage rate associated with the caller's phone.

In some implementations, the caller may set the requirements for sending the voicemail message recorded by the caller's phone to the voicemail system. For example, the caller may require that the caller's phone be connected to a Wi-Fi signal before sending the voicemail message recorded by the caller's phone. As another example, a caller may require that the caller's phone have at least a proportional amount of megabytes left in the caller's monthly data plan relative to the number of days left in the billing cycle before sending the voicemail message recorded by the caller's phone. If insufficient megabytes remain, then the caller may require the caller's phone to wait until it is connected to a Wi-Fi signal. To illustrate this example, a caller's data plan may have 10 days left in the billing cycle and 100 megabytes of data left in the data plan. If the caller's monthly data plan is 500 megabytes, then the caller's phone would determine to wait until the caller's phone is connected to a Wi-Fi signal before sending the voicemail message recorded by the caller's phone. If the caller's monthly data plan is 200 megabytes, then the caller's phone would go ahead and send the voicemail message recorded by the caller's phone even if not connected to a Wi-Fi signal.

In some implementations, the voicemail system may have requirements for when the caller's phone sends the voicemail system the voicemail message recorded by the caller's phone. For example, the voicemail system may require that the caller's phone send the voicemail message recorded by the caller's phone when requested even if the caller's sending parameters dictate otherwise. To illustrate, a caller may require that the caller's phone be connected to a Wi-Fi signal before sending the voicemail message recorded by the caller's phone. However, the voicemail system may have received a request from the callee's phone to listen to the voicemail message. The voicemail system may have determined that during processing and transcribing the voicemail message recorded over the voice connection that the recording of the voicemail message recorded over the voice connection is not of acceptable quality and should not be sent to the callee's phone. In this instance, the voicemail system may require the voicemail message recorded by the caller's phone from the caller's phone before sending the voicemail message to the callee's phone.

When the caller's phone receives a request from the voicemail system for the voicemail message recorded by the caller's phone, the caller's phone may require that the voicemail system send an authentication code to the caller's phone. The authentication code may be based on data identifying the caller, data identifying the callee, the time the caller left the voicemail message, and a key. The caller's phone can compare the authentication code received by the voicemail system with the authentication code determined during the caller's phone's processing of the voicemail message recorded by the caller's phone. If the correlation between the authentication codes is satisfactory, then the caller's phone may proceed with sending the voicemail message recorded by the caller's phone to the voicemail system.

Once the caller's phone sends the voicemail message recorded by the caller's phone to the voicemail system, the caller's phone can delete the local copy of the voicemail message recorded by the caller's phone stored on the caller's phone. In some implementations, the caller's phone may require a confirmation from the voicemail system that the voicemail system has received the voicemail message recorded by the caller's phone before deleting the local copy of the voicemail message recorded by the caller's phone. In some implementations, the caller's phone may delete the local copy of the voicemail message recorded by the caller's phone a particular amount of time after sending the voicemail message recorded by the caller's phone to the voicemail system. For example, the caller's phone may delete the local copy of the voicemail message recorded by the caller's phone one day after sending the voicemail message recorded by the caller's phone to the voicemail system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-readable medium storing software comprising instructions executable by one or more computers which, upon such execution, cause the one or more computers to perform operations comprising:
   detecting, by a caller device, a prompt to leave a voicemail message;
   generating, by the caller device, a recording of the voicemail message based on detecting the prompt;
   storing, by the caller device, the recording of the voicemail message;
   receiving, by the caller device and from a voicemail system, a request to transmit to a voicemail system any stored voicemail messages;
   authenticating the request to transmit to the voicemail system any stored voicemail messages; and
   based on authenticating the request, transmitting, by the caller device and to the voicemail system, the stored recording of the voicemail message.

2. The medium of claim 1, wherein the prompt to leave the voicemail message is detected over a telephone connection between the caller device and a telephone network.

3. The medium of claim 1, wherein detecting a prompt to leave a voicemail message comprises:
   detecting an audio tone associated with leaving voicemail messages.

4. The medium of claim 1, wherein detecting a prompt to leave a voicemail message comprises:
obtaining a transcription of a recording of a telephone call; and
determining that the transcription includes text associated with leaving voicemail messages.

5. The medium of claim 1, wherein detecting a prompt to leave a voicemail message comprises:
receiving, over a voice connection or a data connection, indicia associated with leaving voicemail messages from the voicemail system.

6. The medium of claim 1, the operations further comprising:
generating metadata associated with the recording of the voicemail message, wherein the generated metadata comprises:
a time and date stamp;
data associated with a callee device;
data associated with the caller device; and
an authentication code.

7. The medium of claim 1, the operations further comprising:
before transmitting, by the caller device, the stored recording of the voicemail message, determining when to transmit the stored recording of the voicemail message.

8. A computer-implemented method comprising:
detecting, by a caller device, a prompt to leave a voicemail message;
generating, by the caller device, a recording of the voicemail message based on detecting the prompt;
storing, by the caller device, the recording of the voicemail message;
receiving, by the caller device and from a voicemail system, a request to transmit to a voicemail system any stored voicemail messages;
authenticating the request to transmit to the voicemail system any stored voicemail messages; and
based on authenticating the request, transmitting, by the caller device and to the voicemail system, the stored recording of the voicemail message.

9. The method of claim 8, wherein the prompt to leave the voicemail message is detected over a telephone connection between the caller device and a telephone network.

10. The method of claim 8, wherein detecting a prompt to leave a voicemail message comprises:
detecting an audio tone associated with leaving voicemail messages.

11. The method of claim 8, wherein detecting a prompt to leave a voicemail message comprises:
obtaining a transcription of a recording of a telephone call; and
determining that the transcription includes text associated with leaving voicemail messages.

12. The method of claim 8, wherein detecting a prompt to leave a voicemail message comprises:
receiving, over a voice connection or a data connection, indicia associated with leaving voicemail messages from the voicemail system.

13. The method of claim 8, comprising:
generating metadata associated with the recording of the voicemail message, wherein the generated metadata comprises:
a time and date stamp;
data associated with a callee device;
data associated with the caller device; and
an authentication code.

14. The method of claim 8, comprising:
before transmitting, by the caller device, the stored recording of the voicemail message, determining when to transmit the stored recording of the voicemail message.

15. A system comprising:
one or more computers and one or more storage devices storing instructions that are operable, when executed by the one or more computers, to cause the one or more computers to perform operations comprising:
detecting, by a caller device, a prompt to leave a voicemail message;
generating, by the caller device, a recording of the voicemail message based on detecting the prompt;
storing, by the caller device, the recording of the voicemail message;
receiving, by the caller device and from a voicemail system, a request to transmit to a voicemail system any stored voicemail messages;
authenticating the request to transmit to the voicemail system any stored voicemail messages; and
based on authenticating the request, transmitting, by the caller device and to the voicemail system, the stored recording of the voicemail message.

16. The system of claim 15, wherein the prompt to leave the voicemail message is detected over a telephone connection between the caller device and a telephone network.

17. The system of claim 15, wherein detecting a prompt to leave a voicemail message comprises:
detecting an audio tone associated with leaving voicemail messages.

18. The system of claim 15, wherein detecting a prompt to leave a voicemail message comprises:
obtaining a transcription of a recording of a telephone call; and
determining that the transcription includes text associated with leaving voicemail messages.

19. The system of claim 15, wherein detecting a prompt to leave a voicemail message comprises:
receiving, over a voice connection or a data connection, indicia associated with leaving voicemail messages from the voicemail system.

20. The system of claim 15, the operations further comprising:
generating metadata associated with the recording of the voicemail message, wherein the generated metadata comprises:
a time and date stamp;
data associated with a callee device;
data associated with the caller device; and
an authentication code.

21. The system of claim 15, the operations further comprising:
before transmitting, by the caller device, the stored recording of the voicemail message, determining when to transmit the stored recording of the voicemail message.

* * * * *